United States Patent [19]

Naidich et al.

[11] 4,009,027
[45] Feb. 22, 1977

[54] ALLOY FOR METALLIZATION AND BRAZING OF ABRASIVE MATERIALS

[76] Inventors: Jury Vladimirovich Naidich, ulitsa Vernadskogo, 85, kv. 48; Galina Alexeevna Kolesnichenko, ulitsa Prazhskoya, 3, kv. 128, both of Kiev; Leon Izrailevich Feldgun, Ligovsky prospekt, 3/9, kv. 1; Mark Simonovich Drui, ulitsa Chekhova, 4, kv. 93, both of Leningrad; Boris Dmitrievich Kostjuk, ulitsa Dobrokhotova, 21, kv. 104; Nikolai Stepanovich Zjukin, ulitsa Kurskaya, 8a, kv. 59, both of Kiev; Vladislav Sergeevich Lysanov, ulitsa Vavilovykh, 15, korpus 3, kv. 73; Alla Alexandrovna Lavrinovich, ulitsa Shvernika, 16, kv. 51, both of Leningrad, all of U.S.S.R.

[22] Filed: Nov. 21, 1974

[21] Appl. No.: 525,981

[52] U.S. Cl. .................................. 75/154; 75/156
[51] Int. Cl.$^2$ .......................................... C22C 9/02
[58] Field of Search ........................... 75/156, 154

[56] References Cited

UNITED STATES PATENTS

| 3,528,807 | 9/1970 | Gault | 75/156 |
| 3,730,705 | 5/1973 | Latrobe | 75/156 |

*Primary Examiner*—L. Dewayne Rutledge
*Assistant Examiner*—E. L. Weise
*Attorney, Agent, or Firm*—Holman & Stern

[57] ABSTRACT

The herein-proposed alloy is characterized in that it contains apart from such known components as copper, tin, aluminium, cadmium, zinc, titanium, chromium, zirconium, manganese, molybdenum, tungsten, iron, cobalt and nickel also vanadium, niobium, tantalum and boron taken either separately or in combination, in an amount of 0.001 to 80 weight percent of the total weight of all the components thereof. The alloy is advantageous in possessing good technological characteristics, being resistant to oxidation at elevated temperatures, featuring good adhesion to all kinds of abrasive materials and giving strong brazing alloys and metallization coatings.

2 Claims, No Drawings

ALLOY FOR METALLIZATION AND BRAZING OF ABRASIVE MATERIALS

BACKGROUND OF THE INVENTION

This invention relates generally to the art of producing superhard materials and more specifically to alloys used for metallization and brazing of abrasive materials.

At the present time a great many novel artificial superhard abrasive materials are available, fabricated on the base of diamond, cubic boron nitride, etc.

Inasmuch as the newly-obtained abrasives feature properties other than those possessed by old ones, problems arise of providing novel alloy materials suitable for brazing and metallization of the abrasives, i.e., metal-facing with an alloy to reinforce abrasive grain or the product as a whole. As practical experience shows, the known alloys for brazing and metallization fail to completely meet the requirements imposed by new abrasive materials.

Thus, for instance, synthetic abrasives based on cubic boron nitride or diamond feature very low (700° to 1100° C) temperatures of transition to a hexagonal modification which requires low-temperature alloys for metallization and brazing; on the other hand, synthetic abrasives based on cubic boron nitride feature high chemical stability which in turn requires high adhesion on the part of alloys for brazing and metallization.

At the present time, brazing alloys for carbon-containing abrasive materials are known to be in practical use, in particular, for diamond and graphite abrasives, the alloys being based on copper, silver or gold doped with additives of iron, cobalt and nickel taken either separately or in combination with one another (see, for example, Patent No. 1,207,849 of the German Federal Republic).

Known also are brazing alloys for diamond, silicon carbide, boron carbide and corundum, such as, copper-titanium; silver-titanium, gold-titanium, tin-titanium, lead-titanium, copper-molybdenum, copper-zirconium, copper-vanadium, gold-tantalum, gold-niobium, copper-silver-titanium, copper-gold-titanium, bronze-titanium and copper-tin-titanium, the content of Ti, Mo, Zr and V in the alloys amounting to 10 weight percent. (see, for example, British Patents: No. 989,251; No. 1,100,446; No. 931,672; No. 1,013,337; No. 933,921. Patents of GFR: No. 1,210,300; No. 1,151,666; US Patents: No. 3,192,620; No. 2,570,248; French Patents: No. 1,322,423; No. 1,240,395; "Wetting and Interaction of Metal Melts with the Surface of Diamond and Graphite", Yu.V. Naidich and G. A. Kolesnichenko, "Naukova dumka" Publishers, Kiev 1967 (in Russian).

All of the brazing alloys mentioned above possess low adhesion to such abrasives as cubic boron nitride and corundum, and therefore cannot ensure proper brazing or metallization.

Known in the art are also the following brazing alloys: copper-titanium, silver-titanium and copper-silver-titanium featuring a titanium content amounting to 15 weight percent (see, for example, British Patent No. 932,729; Patent of GFR No. 1,151,666).

The brazing alloys have but a limited field of application, inasmuch as they fail to exhibit strong adhesion to all abrasives; thus, with respect to cubic boron nitride adhesion is low and insufficient to effect firm brazing and uniform coating in the process of metallization.

Another brazing alloy is known to use for diamonds, which is essentially an alloy of gold with 1 to 25 weight percent of tantalum (see, for example, U.S. Pat. No. 3,192,620). The cardinal disadvantage inherent in the alloy resides in the fact that it has a high liquid-phase point (above 1050°) and therefore is restricted but to a narrow field of application, since at 1050° C and over such abrasives as diamond and cubic boron nitride are liable to vigorously pass into hexagonal modification which rather adversely affects the strength of the abrasives.

One more diamond brazing alloy is now in common use, consisting of 75 weight percent of copper and 25 weight percent of titanium.

Principal disadvantages of the alloy is that it is brittle and its thermal expansion factor badly differs from that of the relevant abrasives. All of this inescapably results in thermal stresses arising in the finished products which, in turn, are liable to inflict rapid destruction thereof in the course of operation (manifesting in cracks or chippings) and, consequently, high and premature wear of the tool made of such abrasives.

Also, used for brazing diamond and graphite is silicon or aluminium (both per se) (see, for example, Patent of GFR No. 2,031,915); however, either of these has but a restricted sphere of usage, viz., silicon — due to high melting point (1450°) at which, as has been discussed above, a vigorous transition of diamond to a hexagonal modification occurs, while aluminum — has a high oxidizability and low strength.

All of the brazing alloys described above are used also for metallization of abrasives made of diamond, cubic boron nitride, corundum, etc.

Apart from the alloys discussed above, there are also known some alloys and single metals for surface metallization of abrasives, viz., diamond, cubic boron nitride, silicon carbide and tungsten carbide, the metallization being either single- or multiple-layer. In case of multiple-layer metallization, e.g., for establishing the initial layer, use is made of nickel, copper, zinc, tin, gold, lead or their alloys; for establishing a second layer use is made of an iron-nickel alloy; and for the formation of a third layer copper or bronze is used (see, for example, Patent of GFR No. 2,021,299). Such coatings suffer from the disadvantage that owing to poor adhesion they cohere inadequately to the surface of abrasive materials and therefore are readily separated therefrom even under low applied forces. This fact seems to be explained by the weak mechanical adhesion which occurs between the coating and the base material.

As a result, the abrasive is liable to readily chip during tool operation due to rapid destruction of the coating.

In the case of two-layer metallization coatings, use is made independently of such metals as nickel, copper, cobalt, iron, chromium, as well as their alloys, the sequence of the layers and their arrangement leaving beyond preliminary specification as having no matter (see, for example, French Patent No. 2,093,564). The disadvantage featured by such coatings is their poor adhesion to the abrasive surface. In the case of a two-layer metallization for diamond, titanium is used for the initial layer, while for a second layer iron, nickel, cobalt and alloys thereof are used (see, for example, French Patent No. 2,093,865).

Used for metallization are also nickel, cobalt, silver, copper, molybdenum, titanium, aluminium, manganese, cadmium, tin, zinc, chromium, tungsten, iron, zirconium, niobium, osmium, palladium, platinum, tantalum and their alloys (see, for example, British Patents: No. 1,114,353; No. 1,154,598).

Used for single-layer metallization of abrasive materials, in particular, diamond, corundum, etc. use is made of molybdenum, titanium (as titanium hydride), zirconium (as zirconium hydride), tungsten, tantalum, as well as aluminum (see, for example, Patents of GFR: No. 2,021,399 and No. 2,010,183; British Patent No. 1,100,446; U.S. Patents: No. 2,961,750; No. 3,351,543; No. 2,570,248).

A common disadvantage of the metals or alloys is that they have but a limited field of application, since on account of their high melting points they can be used only as solid-phase coatings applied to diamond or cubic boron nitride and cannot be used as liquid brazing alloys. One more disadvantage inherent in the alloys is their low plasticity which very badly tells on their use as brazing alloys.

SUMMARY OF THE INVENTION

It is a general object of the present invention to obviate the above-mentioned disadvantages inherent in the known alloys for metallization and brazing of abrasive materials.

The present invention has for its specific objects: to improve adhesive properties of the alloys for metallization and brazing in general and specifically to some particular abrasive materials, such as cubic boron nitride and corundum; to extend their field of application at the expense of a broadened range of abrasive materials for which they are applicable; to increase the strength of brazing and of a metallized coating and that of their adhesion to the abrasive material being coated; to reduce the liquid-phase formation point in an alloy so as to render the alloy suitable for application to wider range of materials; such as diamond and cubic boron nitride; to make the resulting brazing alloy or the metallization coating less brittle and approximate its thermal expansion factor to that of the abrasive material being coated so as to reduce thermal stresses in the finished product; to enhance plasticity of the alloys and to ensure that the same alloys can be used both for metallization and for brazing; to impart higher oxidation resistance at elevated temperatures.

These objects are accomplished due to the fact that an alloy for metallization and brazing of abrasive materials, containing at least one metal selected from the group consisting of copper, tin, aluminium, cadmium, zinc, titanium, chromium, zirconium, manganese, molybdenum, tungsten, iron, cobalt and nickel, according to the invention incorporates also at least one element selected from the group consisting of vanadium, niobium, tantalum and boron taken in an amount of 0.001 to 80 weight percent, the rest of the components being the balance.

The alloy of the invention may have the following weight percentage composition: at least one metal selected from the group consisting of copper, tin, aluminium, cadmium and zinc — 10 to 89; at least one metal selected from cobalt and nickel — 0.001 to 11; at least one metal selected from titanium, chromium, zirconium, manganese, molybdenum and tungsten — 0.001 to 80; and at least one element selected from vanadium, niobium, tantalum and boron — 0.001 to 80.

In order to impart low oxidizability to the alloy at elevated temperatures, at least one metal selected from gold, gallium, indium and germanium in an amount of 0.001 to 89 weight percent is added.

Such an alloy may feature the following weight percentage composition:

| | |
|---|---|
| silver | - 10 to 12 |
| gold | - 77 to 85 |
| titanium | - 2 to 5 |
| cobalt | - 0.001 to 1 |
| tantalum | - 3 to 5. |

In order to impart an increased flowability to the alloy 0.001 to 10 weight percent of at least one metal selected from thallium, lead, antimony and bismuth is added. Such alloys are adapted largely for brazing and metallization of abrasives based on cubic boron nitride and diamond (both natural and especially synthetic) which involve the use of such alloys featuring relatively low melting points (not over 800° to 1100° C).

An alloy preferably used for metallization, has the following weight percentage composition:

| | |
|---|---|
| copper | - 60 to 80 |
| tin | - 7 to 17 |
| tungsten and/or molybdenum | - 0.001 to 5 |
| tantalum | - 0.001 to 5 |
| nickel and/or cobalt | - 0.001 to 10 |
| lead and/or bismuth | - 0.001 to 10 |
| titanium and/or zirconium | - 3 to 15. |

An alloy preferably used for brazing, features the following weight percentage composition:

| | |
|---|---|
| copper | - 60 to 80 |
| tin | - 7 to 15 |
| at least one metal selected from tungsten, molybdenum and tantalum | - 10 to 60 |
| titanium and/or zirconium | - 3 to 15 |
| cobalt and/or nickel | - 0.001 to 10 |
| lead and/or bismuth | - 0.001 to 10. |

An alloy possessing an increased oxidation resistance and strength contains also at least one metal selected from the group consisting of osmium, rhodium, palladium, iridium, and platinum, in an amount of 0.001 to 10 weight percent.

The alloy is adapted preferentially for brazing and metallization of materials based on cubic boron nitride and diamond (both natural and especially synthetic), in particular, semiconductor crystals that require the use of an alloy featuring higher oxidation resistance when exposed to elevated temperatures.

Such an alloy may have the following weight percentage composition:

| | |
|---|---|
| copper and/or silver | - 45 to 60 |
| at least one metal selected from gold, germanium and indium | - 10 to 20 |
| tantalum | - 10 to 40 |
| at least one metal selected from lead, bismuth, and thallium | - 2 to 10 |
| at least one metal selected from iron, cobalt, and nickel | - 0.001 to 5 |
| at least one metal selected from osmium, rhodium, palladium, iridium and platinum | - 0.001 to 10 |
| at least one metal selected from | |

-continued

| | |
|---|---|
| titanium, chromium, and zirconium | - 1 to 15. |

Another exemplary alloy composition, possessing higher oxidation resistance and strength at elevated temperatures contains (in weight percent):

| | |
|---|---|
| copper and/or silver | - 50 to 70 |
| at least one metal selected from gold, gallium and indium | - 15 to 30 |
| tantalum | - 0.001 to 5 |
| at least one metal selected from lead, bismuth and thallium | - 2 to 10 |
| at least one metal selected from iron, cobalt and nickel | - 0.001 to 5 |
| at least one metal selected from osmium, rhodium, palladium, iridium and platinum | - 0.001 to 10 |
| at least one metal selected from titanium, chromium and zirconium | - 1 to 15. |

The alloy is expedient to be applied for metallization.

Given below is a detailed description of the invention disclosed by way of illustration in a number of specific exemplary alloy compositions.

Alloys, according to the invention may be used for both metallization and brazing of a variety of synthetic abrasives based on diamond, cubic boron nitride, silicon carbide, tungsten carbide, etc.

Depending upon the purpose and type of abrasive material, an alloy of some requisite predetermined properties is selected in every particular case which will hereinafter be illustrated in practical embodiments of the invention.

Brazing and metalization can be effected by any known method.

Thus, metallization can be carried out by the method of electrodeposition of an alloy upon powdery materials, followed by annealing; the method of gas-transport reactions and deposition of an alloy upon powdery materials; the method of burning into the surface of an abrasive material some powderlike pastes or suspensions of a metallizing alloy that has been doped with any organic adhesive readily burningout under a vacuum or in an inert medium; the method of layer-by-layer deposition of the metallization alloy upon the abrasive material.

Brazing can be performed by the method of pressing the abrasive material into the brazing alloy, followed by melting of the latter so as to make it free to flow in the brazing gap under the action of capillary forces, etc.

All of these methods are intentionally left beyond the scope of the present disclosure as they are common and widely known. The methods proceed under conventional conditions, viz., vacuum not less than 1 or $2.10^{-5}$ mm Hg, or an inert atmosphere (helium, argon, admixture-free nitrogen and oxygen). No use of an oxidizing atmosphere is involved. Whenever none of the components is capable of forming hydrides, the use of a hydrogen atmosphere is also admissible, provided hydrogen is carefully separated from water and oxygen vapors.

The temperature of metallization and brazing is selected within 600° to 1150° C so as to ensure vigorous chemical reactions between the adhesion-active component of the brazing or metallization alloy and the components of the solid phase of the abrasive which, in turn, provides for a strong joint of the brazing or metallization alloy with the abrasive involved.

Now let us refer to the Examples that follow:

EXAMPLE 1

An alloy for metallization of the surface (face) of a diamond crystal.

The alloy was used for metallization of the faces of a diamond crystal weighing 1.5 carats and featured the following weight percentage compositiion:

| | |
|---|---|
| molybdenum | - 5.1 |
| nickel | - 2.4 |
| tin | - 1.8 |
| boron | - 5.0 |
| copper being the balance. | |

The alloy for metallization was fashioned as a foil (platelet) made of a preconditioned alloy. The alloy platelets were attached to the diamond faces with an adhesive readily liable to burn down in a vacuum. Next, the system was annealed in a vacuum of 1 to $2.10^{-5}$ mm Hg at 1150° C for 8 min.

After having been subjected to metallization, the faces of the diamond crystal proved to be coated with a uniform metallic layer strongly attached thereto. The adhesion strength of the coated layer to the crystal was equal to 7.2 kg/mm$^2$, while the metallized crystal was found to destruct both at the metal-to-crystal interface and in the bulk of the crystal itself.

EXAMPLE 2

An alloy for brazing cubic boron nitride.

The alloy was used for brazing a cutting tool made of Elbor (an abrasive based on cubic boron nitride) measuring 4.2 mm in diameter and about 5 mm high, and featured the following weight percentage composition:

| | |
|---|---|
| titanium | - 10.5 |
| manganese | - 1.3 |
| tantalum | - 40 |
| molybdenum | - 5.8 |
| cobalt | - 2.5 |
| copper-tin being the balance. | |

A copper to tin ratio of 4:1 was adopted. Brazing was effected to a steel holder 5 mm in dia. and 20 mm high; a hole for brazing was drilled in the face of a steel rod lengthwise along its axis, leaving a brazing joint clearance of 0.2 mm on either side. The cutting element was forced into a powdery mixture (brazing alloy) prepared from a powdered mixture of the selected metals. Brazing was carried out under a vacuum of 1 to $2.10^{-5}$ mm Hg at 950° C and a pressure of 250 g applied to the tool for 10 min; surplus alloy was squeezed out from the joint clearance.

After having been brazed the tool was free of blowholes, incompletely brazed spots, cracks or spallings; the joint clearance was completely filled; and the adhesion to the cutting element and the holder was good.

Further, the thus-produced straight turning tool was sharpened and tested by coolantless cutting of plain straight cylindrical steel blanks 95 mm in dia. on a screw-cutting lathe under the following machining conditions: cutting speed of 80 to 120 m/min; cutting depth of 0.8 mm (though can amount to 2 or 3 mm); longitudinal feed rate of 0.02 to 0.06 mm. The test showed high durability of the cutting tool, viz., tool separating from the brazing alloy did not occur until the seventh regrinding; the resulting surface finish was of high quality.

EXAMPLE 3

An alloy for diamond brazing.

The alloy was used for brazing a diamond crystal weighing 0.5 carat to a cylindrical steel holder and had the following weight percentage composition:

| | |
|---|---|
| tin | - 14 |
| titanium | - 12 |
| nickel | - 3 |
| tantalum | - 20 |
| silver-copper being the balance. | | silver-copper being the balance.

A silver-to-copper ratio of 72:28 was adopted. The diamond was brazed to a steel holder with one of its pyramids. A brazing alloy of the required composition was placed into a brazing joint clearance, the alloy having been prepared beforehand by fusing its components under vacuum. A centering device was used to orient the diamond crystal so as to make its vertex and axis coincide with the axis of the cylindrical holder. The brazing joint clearance was defined as equal to 0.5 mm. The brazing procedure was conducted under the following conditions: temperature — 880° C; duration — 10 min; atmosphere — argon free of oxygen and nitrogen impurities.

When the thus-brazed diamond was subjected to grinding to obtain a taper with a cone point radius of 50 microns, a good filling of the brazing alloy into the joint clearance was revealed, as well its high adhesion to the diamond crystal. The application of the point in a scleroscopic instrument to make scratches on a material under test proved high reliability of the diamond attachment.

EXAMPLE 4

An alloy for diamond brazing.

The alloy was used to braze two current leads made of 0.5 mm in dia. molybdenum wire to two plane-parallel faces of a diamond crystal, and had the following weight percentage composition:

| | |
|---|---|
| niobium | - 0.004 |
| boron | - 2 |
| iron | - 2 |
| copper being the balance. | |

The procedure consisted in that two pellets of the brazing alloy were applied to the respective two plane-parallel faces of the diamond crystal, the pellets having been preliminarily pressed up of the required components in powdered form, and the pellets were then attached by an adhesive for the sake of reliability. Then two molybdenum wires were brought in contact with the pellets. Brazing occured in a vacuum of 1 to $2.10^{-5}$ mm Hg at 1150° C for 7 min.

The resulting brazed joint was free of blowholes or blisters; the crystal was firmly held by the brazing alloy on the hard molybdenum surface. The adhesion strength of the crystal to the brazing alloy was equal to 7.2 kg/mm² which ensured an adhesive-strong electric contact to the current leads.

EXAMPLE 5

An alloy for brazing boron carbide.

The alloy was used for brazing a boron-carbide crystal measuring 4×4×5 mm to a steel cylindrical rod and had the following weight percentage composition:

| | |
|---|---|
| nickel | - 1.5 |
| chromium | - 10.5 |
| tantalum | - 2.0 |
| copper being the balance. | |

The crystal was brazed to a steel rod 5 mm in diameter and 25 mm high by the end-to-end technique leaving a brazing joint clearance of 0.3 mm, under the following brazing conditions: atmosphere — dehumidified hydrogen free of oxygen and nitrogen impurities; temperature — 1150° C; duration — 7 min.

The brazed joint was free of blowholes or blisters; the crystal adhered strongly to the brazing alloy and was reliably held to the rod being brazed. The adhesion strength of the crystal to the brazing alloy was equal to 7.3 kg/mm².

EXAMPLE 6

An alloy for metallization of the surface of a cubic boron nitride crystal.

The alloy had the following weight percentage composition:

| | |
|---|---|
| vanadium | - 0.003 |
| cobalt | - 0.5 |
| titanium | - 27 |
| copper being the balance. | |

A layer of the alloy was applied to the surface of a single-crystal of cubic boron nitride by dipping the crystal face into a melt of the alloy followed by cooling and crystallization of the alloy. Upon metallization the surface of the crystal was found to be uniformly and firmly coated with a metallic film. The adhesion strength of the metallization layer to the surface of the crystal was equal to about 5 kg/mm² (in terms of crystal-metallic film separation strength). Then current leads made of molybdenum wire were brazed to the metallized crystal face, and the crystal with two current leads bonded to the two plane-parallel faces thereof was used as a thermistor. When exposed to high temperature (up to 600° C) for 4 hours and longer the thermistor retained its initial characteristics.

EXAMPLE 7

An alloy for metallization of the surface of a diamond crystal.

The alloy was used for metallization and had the following weight percentage composition:

| | |
|---|---|
| chromium | - 15.7 |
| tantalum | - 10 |
| gallium | - 0.7 |
| nickel | - 2.4 |
| gold being the balance. | |

A metallic layer was applied to the diamond surface by the method of vacuum-sraying of the alloy and depositing upon the cold surface of the diamond, whereupon the metallization coating was annealed under the same vacuum of 1 to $2.10^{-5}$ mm Hg at 1150° C for 10 min.

Upon metallization the diamond surface was found to be uniformly and firmly coated with a metallic film.

The adhesion strength of the metallization coating was equal to 4 kg/mm² when tested for separation of the diamond from the metallic film.

Then current leads were brazed to the metallized diamond face, and the diamond crystal with two current leads was used as a thermistor. An operational test applied to the thermistor at high temperatures (900 to 1000°) for 3 hours and longer revealed that its initial characteristics remained unaffected.

EXAMPLE 8

An alloy for diamond metallization.

The alloy was used for metallization of two plane-parallel faces of a diamond crystal weighing 2 carats and had the following weight percentage composition:

| | |
|---|---|
| indium | - 7.9 |
| cobalt | - 2.7 |
| zirconium | - 18 |
| niobium | - 0.9 |
| copper-silver being the balance. | |

A copper-to-silver ratio of 3:7 was adopted.

The metallization alloy was taken as a mixture of the aforesaid components in a powder phase having a fineness of about 50 microns. Then the powderlike alloy was kneaded on a readily burning-down adhesive till acquiring a suspensionlike state so as to apply it to the diamond crystal face by dipping the latter thereinto. Subsequently, the metallization layer was burnt into the diamond surface in a helium atmosphere free of oxygen and nitrogen admixtures, at a temperature of 900° C for 15 min.

Upon metallization, the diamond crystal faces were coated with a uniform metallic layer strongly attached to the diamond. The adhesion strength of the layer to the diamond was equal to 4.0 kg/mm², while the diamond-to-coating joint was destructed at the diamond-metal structural interface, and in some cases even in the bulk of the diamond itself (individual spalls were shown on the crystal surface).

EXAMPLE 9

An alloy for brazing silicon carbide.

The alloy was used for brazing a silicon carbide crystal masuring 3×3×3 mm to a cylindrical nickel holder; the alloy featured the following weight percentage composition:

| | |
|---|---|
| germanium | - 8.8 |
| iron | - 4.0 |
| titanium | - 11.3 |
| tantalum | - 40 |
| copper-aluminium being the balance. | |

A copper-to-aluminium ratio of 9:1 was adopted.

Brazing was carried out by the end-to-end technique to a cylindrical nickel holder 5 mm in diameter. A brazing joint clearance was left equal to 0.3 mm, the brazing alloy was prepared as a pellet containing the required components in powdered form pressed together. The following brazing conditions were adopted: temperature — 1000° C; duration — 5 min; atmosphere — helium free of nitrogen and oxygen impurities.

The resulting brazed joint showed no blowholes or blisters; the crystal was strongly attached to the alloy and was firmly held to the hard nickel surface. The adhesion strength of the crystal to the alloy was 6 kg/mm².

EXAMPLE 10

An alloy for brazing a boron carbide crystal.

The alloy was used for brazing two 0.4 mm in dia. current leads from tantalum wire to two plane-parallel faces of a crystal measuring 1×2×2 mm; the alloy had the following weight percentage composition:

| | |
|---|---|
| tungsten | - 1.5 |
| cobalt | - 2.7 |
| chromium | - 11 |
| vanadium | - 6.8 |
| copper being the balance. | |

Some pieces of the alloy were applied to the two plane-parallel faces of the crystal and attached thereto by an organic cement; then the tantalum-wire current leads were brought in contact with the faces. Brazing was performed in an atmosphere of helium free of oxygen and nitrogen impurities at 1150° C for 5 min.

Upon brazing, the current leads were found to be strongly attached to the crystal which ensured a reliable electric contact therebetween.

EXAMPLE 11

An alloy for brazing a diamond crystal to metal current leads.

The alloy had the following weight percentage composition:

| | |
|---|---|
| silver | - 11 |
| titanium | - 5 |
| cobalt | - 0.5 |
| tantalum | - 4 |
| gold being the balance. | |

A layer of the alloy was applied to the surface of a diamond crystal by dipping the face thereof into a melt of the alloy, followed by cooling and crystallization of the alloy. After metallization the surface of the crystal was found to be uniformly and strongly coated with a metallic film. The adhesive strength of the metallization layer to the surface of the crystal was equal to about 5 kg/mm² when tested for separation of the crystal-to-metallic film joint. Then tungsten-wire current leads were brazed to the metallized surface of the crystal face, and the crystal with two current leads bonded to the two plane-parallel crystal faces was used as a thermistor. Upon being subjected to an operational test at elevated temperatures (800° to 900° C) within 4 hours the thermistor showed no changes in its initial characteristics.

EXAMPLE 12

An alloy for diamond metallization.

The alloy as used for metallization of diamond powder having a fineness of 100 microns; the alloy had the following weight percentage composition:

| | |
|---|---|
| tin | - 17 |
| bismuth | - 1.5 |
| tantalum | - 0.2 |
| titanium | - 11 |
| molybdenum | - 0.3 |
| nickel | - 2.2 | copper being the balance.

A metallic coating was applied by the method of conjoint liquid-phase sintering of a powdered diamond and the alloy for metallization in powdered form, with subsequent grinding down of the resultant sinter cake till obtaining separate grains. The metallization powder was prepared by intermixing the aforesaid metal components for 25 to 30 min; the metal powders were selected to have a fineness of about 50 microns. Then the metallization powder was uniformly mixed with the powdered diamond in a weight percent ratio of 25:75, respectively. The following metallization conditions were adopted: vacuum — 1 to $2.10^{-5}$ mm Hg; temperature — 850° to 900° C; duration of the process — 20 min.

Upon metallization, the powdered diamond was uniformly coated with a metallic film, the liquid alloy showed good spreading over the surface of the diamond powder. The crushing strength of the metallized diamond grains was four times that of nonmetallized grains. Testing of organic-bonded diamond grinding wheels made with the use of metallized diamonds proved their productive efficiency 3.5 times that of similar grinding wheels made of nonmetallized diamonds.

EXAMPLE 13

An alloy for metallization of cubic boron nitride.

The alloy of the following weight percentage composition was used for the purpose:

| | |
|---|---|
| boron | - 0.5 |
| cobalt | - 1.3 |
| titanium | - 14 |
| thallium | - 1.8 |
| antimony | - 0.7 |
| copper-silver being the balance. | |

A copper-to-silver ratio of 28:72 was adopted, the fineness of a powdered cubic boron nitride was 80 microns. A metallic coating was applied by the method of the liquid-phase cosintering of a powdered cubic boron nitride and the alloy for metallization in powdered form, followed by grinding the resultant sinter cake to obtain separate grains. The metallization alloy was prepared beforehand by vacuum melting of the aforesaid components at 1 to $3.10^{-5}$ mm Hg, 1000° C for 10 min, with subsequent rendering of the alloy into a powder with a fineness of 60 to 80 microns. Then the powdery metallization alloy was uniformly mixed with a powdered cubic boron nitride in a weight percent ratio of 40:60, respectively. The following metallization conditions were adopted: atmosphere — helium free of oxygen and nitrogen impurities; temperature — 900° to 950° C, duration of the process — 20 min.

Upon metallization, the powdered cubic boron nitride was uniformly coated with a metallic film, the liquid alloy exhibited good spreading capacity with respect to the surface of the powder. The crushing strength of the metallized cubic boron nitride grains was 5.5 times that of nonmetallized grains. Testing of organic-bonded abrasive grinding wheels made on the basis of the metallized cubic boron nitride powders showed their productive capacity 3 times that of similar grinding wheels made of nonmetallized powders of cubic boron nitride.

EXAMPLE 14

An alloy for metallization of silicon carbide.

The alloy for metallization of silicon carbide had the following weight percentage composition:

| | |
|---|---|
| manganese | - 3 |
| zirconium | - 14 |
| molybdenum | - 1.7 |
| tantalum | - 3 |
| bismuth | - 5 |
| nickel | - 6 |
| copper-tin being the balance. | |

A copper-to-tin ratio of 4:1 was adopted, a silicon carbide powder had a fineness of 60 microns. A metallic layer was applied by the method of liquid-phase cosintering of a powdered silicon carbide and the metallization alloy in powdered form, followed by grinding down the resultant sinter cake to obtain separate grains. The metallization alloy was essentially a mixture of the powders of the aforesaid metals prepared by their intermixing for 25 to 30 min; the fineness of the powdered metals was 50 microns. Then the metallization alloy was uniformly mixed with powdered silicon carbide, the weight percent ratio being 30:70. The following metallization conditions were adopted: atmosphere — argon free of oxygen and nitrogen impurities; temperature — 1000° to 1050° C; duration of the process — 20 min.

Upon metallization, the powdered silicon carbide was uniformly coated with a metallic film strongly adhering to the surface of the grains. The crushing strength of the metallized silicon carbide grains was 3.7 times that of nonmetallized grains. Testing of organic-bonded diamond grinding wheels, wherein silicon carbide was used as an abrasive filler, showed their productive capacity 2.3 times that of grinding wheels using nonmetallized silicon carbide.

EXAMPLE 15

An alloy for metallization of a boron carbide crystal.

The alloy was applied for metallization of the surface of a boron carbide crystal sized about 0.5 cm² and had the following weight percentage composition:

| | |
|---|---|
| boron | 1.5 |
| titanium | - 24 |
| tungsten | - 5 |
| cobalt | - 8.1 |
| thallium | - 3.2 |
| brass being the balance. | |

The brass had the following weight percentage composition: copper — 70; iron — 0.1; lead — 0.03; bismuth — 0.002; antimony — 0.05; zinc being the balance. The metallization alloy was made as a 50 microns thick foil prepared by rolling layers of the metals specified above, laid one upon another. Then the resulting laminated alloy, consisting of a titanium layer 15 microns thick, molybdenum — 1.5 microns thick, cobalt — 5 microns thick, thallium — 1 microns thick and brass — 27.5 microns thick, having a total thickness of 50 microns was bonded with the titanium surface to the face of a boron carbide crystal by using a readily burning-down adhesive, whereupon the system was annealed in an atmosphere of argon free of nitrogen and oxygen impurities, at 900° C for 15 min.

Upon metallization, the surface of the boron carbide crystal was found to be coated with a uniform metallic film strongly bonded with the crystal. The adhesion strength of the metallized coating to the crystal as determined by a scleroscopic test using a diamond needle having a point grinding radius of 50 microns, proved to be rather high, being equal to 750 g (in terms of a force applied to the needle until the bonded metal is removed from the surface of the crystal and the latter is exposed completely).

EXAMPLE 16

An alloy for brazing cubic boron nitride.

The alloy was used for brazing a cutting tool made of Elbor (an abrasive based on cubic boron nitride) and measuring 4.1 mm in diameter and 4.9 mm high. The alloy had the following weight percentage composition:

| | |
|---|---|
| cobalt | - 0.7 |
| titanium | - 10.8 |
| tantalum | - 35 |
| bismuth | - 2.8 |
| brass being the balance. | |

The brass had the following weight percentage composition: copper — 81; iron — 0.1; lead — 0.03; bismuth — 0.002; antimony — 0.05; zinc being the balance.

Brazing was carried out to a steel holder 10 mm in diameter and 25 mm high; a brazing hole was drilled along the axis of a steel rod; a brazing joint clearance of 0.3 mm was left on either side. The cutting element was pressed into a powdery mixture (alloy) prepared for brazing from powders of the above-specified metals; an excess amount of the brazing alloy was taken.

Brazing occurred in a vacuum of 1 to $2.10^{-5}$ mm Hg at 950° to 990° C for 10 min under a pressure of 300 g applied to the tool; the surplus alloy was squeezed out from the joint clearance.

Upon brazing, the tool was free of blowholes, incompletely brazed spots, blisters, cracks or spalls; the joint clearance was completely filled with the alloy; the adhesion of the alloy to the tool and the holder was good.

Further, a boring tool was made of the specimen and ground. The thus-prepared tool was tested by coolantless cutting of tool steel using the following cutting conditions: turning speed of 80 to 100 m/min; rate of longitudinal feed of 0.01 to 0.08 mm/rev; cutting depth of 0.2 mm; maximum admissible cutting depth of 2.5 to 3 mm. When machining workpieces of the sleeve-shaft type with the tool, the latter manifested high durability, that is, no displacement of the tool body with respect to the alloy or its loosening or separation from the alloy was revealed until the 7th regrinding. The tool produced a high surface finish.

EXAMPLE 17

An alloy for brazing cubic boron nitride.

The alloy was used for brazing a cutting tool made of Elbor (a polycrystalline abrasive based on cubic boron nitride) sized 4.3 mm in diameter and 5.1 mm high. The alloy had the following weight percentage composition:

| | |
|---|---|
| cobalt | - 1.8 |
| tantalum | - 7 |
| zirconium | - 11.2 |
| lead | - 10 |
| molybdenum | - 35 |
| copper-tin being the balance. | |

A copper-to-tin ratio of 4:1 was adopted.

Brazing was effected to a 8.0 mm in dia. and 25 mm high steel holder, a brazing hole was drilled along the axis of a steel rod; a brazing joint clearance was left equal to 0.3 mm on either side. The brazing alloy was placed into the brazing joint clearance in the form of a moulding of a preprepared alloy, while an Elbor blank was laid thereon. The brazing alloy was taken in an excess amount.

Brazing occurred in a vacuum of 1 to $2.10^{-5}$ mm Hg at 950° C for 10 min under a pressure of 300 g applied to the tool; the surplus alloy was squeezed out from the brazing joint clearance.

Upon brazing the tool was free of blowholes, poorly brazed spots, blisters, cracks or spalls; the joint clearance was completely filled with the brazing alloy; good adhesion of the alloy to the tool and the holder was observed.

Then a facing tool was made of the thus-prepared specimen, ground and tested by coolantless steel cutting under the following cutting conditions: cutting speed of 90 to 120 m/min; longitudinal feed rate of 0.04 to 0.08 mm/rev; cutting depth of 0.2 mm; maximum practicable depth of 2.5 to 3 mm. The test showed high durability of the tool, i.e., no displacement of the tool stem with respect to the brazing alloy or its loosening or separation from the alloy was revealed until the 7th regrinding. The surfaces machined by the tool showed a high surface finish.

EXAMPLE 18

An alloy for metallization of cubic boron nitride.

The alloy was used for metallization of the side and end surfaces of a cubic boron nitride polycrystal moulding having a diameter of 4.1 mm and a height of 5 mm. The alloy had the following weight percentage composition:

| | |
|---|---|
| titanium | - 11.2 |
| nickel | - 2.3 |
| manganese | - 1.5 |
| tantalum | - 35 |
| bismuth | - 2.6 |

The brass being the balance (the composition of brass being the same as in Example 15).

The alloy was prepared as a suspension kneaded on an organic cement and was applied with a brush. Metallization was done under the following conditions: vacuum of 1 to $2.10^{-5}$ mm Hg; temperature of 900° to 950° C; duration of the process of 10 min. Once the metallized cake had been cooled, it was shrunk-in into a hole of a steel holder 15 mm in length and 8 mm in diameter with brass, less any adhesion-active additives. The process of shrinking-in was done in air under a flux, the heating process (high-frequency induction heating) took 5 to 10 sec at 780° to 800° C, i.e., under conditions that prevent the metallization layer from being oxidized and protect adhesion attained in the metallization process.

Upon having been brazed the tool was free of blowholes, cracks or spalls; the joint clearance was completely filled with the brazing alloy; and good adhesion bonding of the alloy to the tool and the holder was observed.

Then the thus-obtained specimen was ground into a straight-turning tool which was tested by coolantless cutting of plain straight cylindrical blanks of a 95 mm in dia. steel rod on a screw cutting lathe under the following machining conditions: cutting speed of 80 to 100 m/min; cutting depth of 0.8 mm; maximum practicable cutting depth of 2.5 to 3 mm; longitudinal feed rate of 0.04 to 0.06 mm. The test proved that the tool is highly durable, i.e., it was free from displacement of its stem with respect to the brazing alloy, loosening or separation from the alloy. The tool withstood 6 regrindings and produced a high surface finish.

EXAMPLE 19

An alloy for metallization of cubic boron nitride.

The alloy was used for metallization of the side and end surfaces of a cubic boron nitride polycrystal moulding having a diameter of 4.0 mm and a height of 5 mm. The alloy had the following weight percentage composition:

| | |
|---|---|
| vanadium | - 7 |
| zirconium | - 10.9 |
| cobalt | - 1.6 |
| lead | - 6 |
| thallium | - 3 |
| tantalum | - 40 |
| copper-tin being the balance. | |

A copper-to-tin ratio of 4:1 was adopted.

The alloy was applied as a suspension of the metallization alloy in powdered form kneaded on an organic cement. The metallization conditions were as follows: atmosphere — helium free of oxygen and nitrogen admixtures; temperature — 900° to 950° C; duration of the process — 7 min.

Once the metallized polycrystal of cubic boron nitride had been allowed to cool down, it was shrunk-in into the brazing hole filled with molten bronze. Brazing was effected to a steel cylinder-shaped holder, wherein an axial hole had been drilled with a joint clearance of 0.4 mm on either side. Shrinking-in was performed in air under a flux, the heating process (high-frequency induction heating) took 10 sec, i.e., under conditions preventing oxidation of the metallized coating and disturbance of adhesion attained in the process of metallization.

After having been brazed, the tool was free of poorly brazed spots, blowholes, cracks; the brazing alloy completely filled the joint clearance; adhesion to the cutting element and the holder was good. Then the thus-prepared specimen was ground to obtain a straight-turning tool which was tested by coolantless turning of plain straight cylindrical rod blanks 95 mm in dia. on a precision screwcutting lathe under the following machining conditions: cutting speed of 80 to 120 m/min; cutting depth of 0.8 mm; longitudinal feed rate of 0.06 mm/rev. The test showed high durability of the tool which was strongly held in the brazing alloy and withstood seven regrindings; besides, it produced a high surface finish.

EXAMPLE 20

An alloy for brazing cubic boron nitride.

The alloy was used for brazing a tool made of Elbor (an abrasive based on cubic boron nitride) and having a diameter of 4.0 mm and a height of 4.5 mm. The alloy had the following weight percentage composition:

| | |
|---|---|
| tantalum | - 5 |
| zirconium | - 14 |
| bismuth | - 7.3 |
| tungsten | - 40 |
| nickel | - 8 |
| brass being the balance. | |

The composition of the brass was the same as in Example 15. Brazing was effected to a 5.5 mm in dia. and 20 mm high steel holder, a brazing hole was drilled in the end face of a steel rod lengthwise along its axis, leaving a brazing joint clearance of 0.2 mm on either side. The cutting element was pressed into a powdery mixture (brazing alloy) prepared from powders of the selected metals; the brazing alloy was taken in an excess amount.

Brazing was carried out in an atmosphere of helium free of nitrogen and oxygen impurities, at 1000° C for 10 min, a pressure of 300 g being applied to the tool; the surplus alloy was squeezed out from the brazing joint clearance.

After the tool had been brazed it was free of blowholes, poorly brazed spots, blisters, cracks or spalls; the brazing alloy was found to have completely filled the joint clearance; good adhesion of the alloy to the tool and the holder was observed.

Further on, the thus-prepared specimen was ground to obtain a straight-turning tool which was then tested by coolantless turning of plain straight cylindrical rod blanks 95 mm in diameter on a precesion screw-cutting lathe under the following machining conditions: cutting speed of 80 to 100 m/min; cutting depth of 0.8 mm; maximum obtainable cutting depth of 2.5 to 3 mm; rate of longitudinal feed of 0.04 to 0.06 mm/rev. The test revealed high durability of the tool, i.e., it was free of any dislodging of its stem from the brazing alloy, or getting loose, or separating from the alloy until the 6th regrinding; the surface finish attainable with the tool was high.

EXAMPLE 21

An alloy for metallization of the surface of cubic boron nitride.

The alloy was used for metallization of some of the faces of a cubic boron nitride crystal sized 1.5 mm and had the following weight percentage composition:

| | |
|---|---|
| gold | - 30 |
| indium | - 7 |
| bismuth | - 2 |
| vanadium | - 12 |
| manganese | - 3 |
| nickel | - 3 |
| platinum | - 8 |
| silver-copper being the balance. | |

A copper-to-silver ratio of 3:7 was adopted. The metallization alloy was essentially a powdered mixture of the aforesaid components. Then the powdered mixture was kneaded on an adhesive liable to easily burn down under a vacuum or in an inert atmosphere, to obtain a suspension which was then applied to the face of a cubic boron nitride crystal by dipping it thereinto. Subsequently, the metallization layer was burnt-in into the crystal surface in an atmosphere of purified argon at 920° to 980° for 10 min.

After having been subjected to metallization the faces of the cubic boron nitride crystal proved to be coated with a uniform metallic film strongly bonded to the crystal. The adhesion strength of the metallization layer to the crystal (separation strength) was 5.7 kg/mm$^2$, destruction of the metallized crystal occurred by 50 percent at the metal-to-crystal interface and 50 percent across the bulk of the crystal itself.

EXAMPLE 22

An alloy for metallization of the surface of silicon carbide.

The alloy was used for metallization of the face of a silicon carbide crystal having an area of 1 cm$^2$; the alloy had the following weight percentage composition:

| | |
|---|---|
| gallium | - 8 |
| antimony | - 1.6 |
| manganese | - 13 |
| niobium | - 24.2 |
| osmium | - 7.3 |
| iron | - 1.1 |
| copper being the balance. | |

The Nb-Mn-OS-Ir-Sb-Ga-Cu alloy was applied to the surface of a silicon carbide crystal in consecutive layers each 25 microns thick, by the method of vacuum metal spraying and deposition upon the cold crystal face, the process being accompanied by checking the thickness of the deposited metallic layer to take account of its weight content. The deposition process was followed by annealing of the obtained coating under the same vacuum (1 to 2.10$^{-5}$ mm Hg) at 1000° to 1050° C for 7 min.

After having been subjected to metallization the face of the silicon carbide crystal was coated with a uniform metallic layer strongly adhering to the crystal. The adhesion strength of the metallic layer to the crystal (separation strength) was 7.6 kg/mm$^2$; when subjected to a destructive test for separation, the metallized crystal sustained destruction both at the metal-to-crystal interface and in the bulk of the crystal itself.

EXAMPLE 23

An alloy for metallization of cubic boron nitride.

The alloy was used for metallization of a cubic boron nitride powder having a fineness of 250 microns and had the following weight percentage composition:

| | |
|---|---|
| zirconium | - 15 |
| tantalum | - 2.2 |
| iron | - 0.3 |
| rhodium | - 0.4 |
| germanium | - 0.6 |
| lead | - 4.8 |
| copper-aluminium being the balance. | |

A copper-to-aluminium ratio of 9:1 was adopted. A metallization coating was applied by the method of cosintering powdered cubic boron nitride and the metallization alloy in powdered form, followed by grinding the sintered powders to obtain separate grains. The metallization composition was selected as a mixture of the powders of the required metal components that had been prepared beforehand by mixing the components for 25 to 30 min; the fineness of the powdered metals was about 50 microns. Then the metallization composition was mixed uniformly with powdered cubic boron nitride, in a weight percent ratio of 35:65, respectively. To avoid a possibility of pouring fine metal powders through larger abrasive powders, an organic cement readily burning down under a vacuum or in an inert atmosphere was added to the mixture. The following metallization conditions were adopted: vacuum of 1 to 2.10$^{-5}$ mm Hg; temperature of 950° C; duration of the process of 20 min.

Upon metallization the powdered cubic boron nitride was uniformly coated with a metal film; the liquid alloy showed good spreading capacity with respect to the surface of the powder. The crushing strength of the metallized grains of cubic boron nitride was 3.9 times that of nonmetallized grains. Testing of organic-bonded abrasive grinding wheels made with the use of metallized cubic boron nitride powders showed their productive capacity being three times that of similar grinding wheels made of nonmetallized cubic boron nitride powders.

EXAMPLE 24

An alloy for metallization of a crystal of cubic boron nitride.

The alloy was used for metallization of the face of a cubic boron nitride crystal sized 1.5 mm and had the following weight percentage composition:

| | |
|---|---|
| cobalt | - 2.7 |
| chromium | - 18 |
| tantalum | - 3.1 |
| rhodium | - 7.3 |
| bismuth | - 1.3 |
| gold-germanium being the balance. | |

A gold-to-germanium ratio of 4:1 was adopted.

The alloy was applied to the surface of a cubic boron nitride crystal in a layer of a total thickness of 30 microns by the method of vacuum spraying and deposition of the sprayed alloy upon the cold faces of a crystal; the process was accompanied by checking the deposited metallic film for thickness so as to take account of its weight content. The deposition process was followed by annealing of the obtained coating under the same vacuum (1 to 2·10$^{-5}$ mm Hg) at 1000° to 1100° C for 8 min.

After having been subjected to metallization the face of the cubic boron nitride crystal was found to be coated with a uniform metallic layer strongly attached to the crystal. The adhesion strength of the metallization layer was determined scleroscopically by scratching the layer with a diamond needle having its point ground as a sphere with a diameter of 50 onicrons; the needle did not remove microns; coating to expose the crystal surface until a force of 450 g was applied thereto.

EXAMPLE 25

An alloy for brazing cubic boron nitride.

The alloy was used for brazing a tool made of Elbor and measuring 4.1 mm in diameter and 5.0 mm in height. The alloy had the following weight percentage composition:

| | |
|---|---|
| titanium | - 2.3 |
| gold | - 10 |
| thallium | - 0.5 |
| iridium | - 0.3 |
| iron | - 1.2 |
| tantalum | - 30 |
| silver-copper being the balance. | |

A copper-to-silver ratio of 28:72 was adopted.

Brazing was done to a 8 mm in dia. and 25 mm high steel holder, a brazing hole was drilled square with the axis of a steel rod; a brazing joint clearance of 0.15 to 0.2 mm was left on either side. The brazing alloy was placed into the brazing joint clearance as a moulding prepared beforehand, while the Elbor tool was put thereupon; the brazing alloy was taken in an excess amount.

Brazing was carried out in an atmosphere of argon free of oxygen and nitrogen, at 950° C for 7 to 10 min under a pressure of 250 g applied to the tool; the surplus alloy was squeezed out from the brazing joint clearance.

After having been brazed the tool was free of blowholes, poorly brazed spots, blisters, cracks or spalls; the brazing alloy was found to have completely filled the brazing clearance; good adhesion of the alloy to the tool and the holder was observed.

Then the thus-prepared specimen was ground to obtain a screw-cutting tool which was then tested by coolantless steel cutting under the following machining conditions: cutting speed of 90 to 120 m/min; rate of longitudinal feed of 0.04 to 0.08 mm/rev; cutting depth of 0.2 mm; maximum obtainable cutting depth of 2.5 to 3 mm. The test showed high durability of the tool which was substantiated by the absence of any dislodging of the tool stem from the alloy, loosening or separation of the tool from the alloy until the 5th regrinding. Besides, the tool was found to produce a high-quality surface finish.

EXAMPLE 26

An alloy for brazing a crystal of cubic boron nitride.

The alloy was used for brazing two current leads made of 0.1 mm in dia. tungsten wire to two plane-parallel faces of a crystal measuring 0.8 ×0.8×0.8 mm. The alloy had the following weight percentage composition:

| | |
|---|---|
| lead | - 3.7 |
| zirconium | - 7 |
| cobalt | - 1.5 |
| vanadium | - 5 |
| rhodium | - 2.8 |
| palladium | - 3.9 |
| gold-germanium being the balance. | |

A gold-to-germanium ratio of 4:1 was adopted.

A layer of paste (suspension) made as a mixture of the metal components of the brazing alloy kneaded on an organic cement, was applied to two plane-parallel faces of a crystal, whereupon brought thereto were tungsten-wire current leads. Brazing occurred in a vacuum of 1 to 2.10$^{-5}$ mm Hg at 1100° C for 5 min.

The crystal was thus firmly attached to the current leads by the brazing alloy, whereby a proper and reliable electric contact was provided.

EXAMPLE 27

An alloy for diamond brazing.

The alloy was used for brazing a polycrystalline diamond cake 3.5 mm in diameter and 4.5 mm high and had the following weight percentage composition:

| | |
|---|---|
| titanium | - 12.7 |
| chromium | - 2.4 |
| nickel | - 1.9 |
| vanadium | - 3.8 |
| antimony | - 0.8 |
| iridium | - 2.4 |
| platinum | - 3.2 |
| silver-copper-indium being the balance. | |

A silver-copper-indium ratio of 63:27:10 was adopted.

Brazing was effected to a 10 mm in dia. and 20 mm high steel holder. A brazing hole was drilled in the end face of a steel rod lengthwise along its axis, leaving a brazing joint clearance of 0.3 mm on either side. The cutting element was pressed into a powdery mixture (brazing alloy) prepared beforehand from a mixture of the required metals. Brazing occurred in a vacuum of 1 to 2·10$^{+5}$ mm Hg at 800° C for 15 min under a pressure of 30 to 50 g applied to the tool; the surplus alloy was squeezed out from the brazing joint clearance.

After having been brazed the tool was free of blowholes, blisters, poorly brazed spots, cracks or spalls; the brazing alloy was found to have completely filled the brazing clearance; good adhesion of the alloy to the tool and the holder was observed.

Then the thus-prepared specimen was ground to obtain a straight turning tool which was tested by machining nonferrous metals under the following machining conditions: cutting depth of 0.8 to 2.5 mm; cutting speed of 100 m/min; rate of longitudinal feed of 0.02 to 0.06 mm/rev. The test showed high durability of the tool, i.e., no tool separation from the alloy was revealed until the 5th regrinding. The tool was found to produce a high-quality surface finish.

EXAMPLE 28

An alloy for diamond metallization.

The alloy was used for metallization of the side and end surfaces of a polycrystalline diamond moulding 3.6 mm in diameter and 4.8 mm high. The weight percentage composition of the alloy was as follows:

| | |
|---|---|
| titanium | - 12.1 |
| niobium | - 3.5 |
| thallium | - 0.8 |
| cobalt | - 0.4 |
| palladium | - 1.3 |
| tantalum | - 30 |
| copper-silver-indium being the balance. | |

A silver-indium-copper ratio of 49:31:20 was adopted.

The alloy was applied by dipping the diamond moulding into a suspension of the alloy in powdered form kneaded on an organic cement. Metallization occurred under the following conditions: atmosphere — argon free of oxygen and nitrogen impurities; temperature — 750° to 800° C; duration of the process — 20 min.

After the metallized diamond polycrystal had been colled, it was shrunk-in into a brazing hole with a molten brazing alloy. Brazing was done to a cylindrical steel holder, wherein an axial hole had been drilled leaving a clearance of 0.3 mm on either side. Shrinking-in was made in air under a flux, the heating and bonding process took 10 sec (high-frequency induction heating being applied), i.e., under conditions preventing oxidation of the metallization layer and disturbance of adhesion attained during metallization.

After having been brazed, the tool was free of blowholes, blisters, poorly brazed spots, cracks or spalls; the brazing clearance was found to have been completely filled with the brazing alloy; good adhesion of the alloy to the tool and the holder was observed.

Then the thus-prepared specimen was ground to obtain a straight turning tool which was tested by machining nonferrous metals under the following machining conditions: cutting depth of 0.8 to 3 mm; cutting speed of 120 to 180 m/min; longitudinal feed rate of 0.02 to 0.08 mm/rev. The test showed high durability of the tool, i.e., no tool separation from the alloy was found until the 5th regrinding. A high surface finish was produced by the tool.

What is claimed is:

1. An alloy for metallization and brazing of abrasive meterials, consisting essentially of, by weight:
   60–80% copper;
   7–17% tin;
   0.3–5% of at least one metal selected from the group consisting of tungsten and molybdenum;
   0.003–5% tantalum;
   0.5–8.16% of at least one metal selected from the group consisting of cobalt and nickel;
   1.5–10% of at least one metal selected from the group consisting of lead and bismuth; and
   3–15% of at least one metal selected from the group consisting of zirconium and titanium.

2. An alloy for metallization and brazing of abrasive materials, consisting essentially of, by weight:
   25.2–85.7% copper;
   1.8–17% tin;
   0.3–35% of at least one metal selected from the group consisting of tungsten and molybdenum;
   3–15% of at least one metal selected from the group consisting of titanium and zirconium;
   0.5–8.16% of at least one metal selected from the group consisting of cobalt and nickel; and
   1.5–10% of at least one metal selected from the group consisting of lead and bismuth.

* * * * *